United States Patent Office 2,900,484
Patented Aug. 18, 1959

2,900,484

AUTOMATIC ARC WELDING PROCESS AND MACHINE

Francois Georges Danhier, Anderlecht, Belgium, assignor to La Soudure Electrique Autogene, S.A., Brussels, Belgium, a corporation of Belgium No Drawing. Application February 19, 1958
Serial No. 716,017

Claims priority, application Belgium March 5, 1957

1 Claim. (Cl. 219—74)

The Belgian Patent No. 547,243 (supplemented by improvement Patent No. 550,612) which subject matter is contained in my U.S. patent application, Serial No. 635,239, filed January 22, 1957, for Automatic Arc Welding Process, Equipment and Electrode, describes a process of automatic electric arc welding under a shielding gas atmosphere, using a continuous metallic electrode comprising a metallic shell optionally provided with internal projections and surrounding a granulated core made up primarily of a mixture of deoxidizers and of slag-forming material, said core amounting to 24 up to 42 percent of the weight of the metallic portion.

In this process, the metal deposited during welding originates entirely or for the major part from the metallic strip forming the shell of the cored electrode, and from its internal projections.

The molten metal is protected mainly by a layer of liquid slag and additionally by a shielding gaseous atmosphere of carbon dioxide.

This process is applicable mainly for low carbon steel. It was also considered for use with alloyed steels. In that case, the alloyed elements could be mixed in the core as ferro-alloys as described in Belgian Patent No. 547,243, (U.S. application Serial No. 635,239) or they could, in a still simpler manner, be present in the metallic shell which is then made of a strip of alloy steel. Both means can also be used simultaneously to enhance the particular advantages of each of them.

However, when austenitic stainless steel is welded under a shielding atmosphere of $CO_2$ with electrodes of the type described in Patent No. 547,243, and in which nickel and chromium have been added in powder or other form, a slight carburization of the stainless steel fillet weld is observed, due to the action of gaseous $CO_2$ upon the metallic chromium being transferred through the arc. This carburization increases the carbon content in the metal at least 0.03% beyond the initial content.

For instance, a wire consisting of a metallic shell of a stainless steel containing 20% chromium, 8% nickel and 0.05% carbon, and of a core of the type described in Belgian patent No. 547,243 gave a weld deposit of the following analysis:

| | Percent |
|---|---|
| Carbon | 0.081 |
| Chromium | 19.20 |
| Nickel | 8.05 |

The carbon increase is therefore 0.03%.

The rise in carbon content in the fillet weld in stainless steels is highly objectionable for many industrial applications. For austenitic steels, this carburization results in a drop in the ability to resist inter-crystalline cracking by corrosion, and causes increased brittleness.

One of the objects of the invention is to improve the process described in Belgian Patent No. 547,243 (U.S. application Serial No. 635,239) to make it applicable in the welding of austenitic stainless steels, without producing a carburization of the metal apt to give to the fillet welds properties other than those of the base metal.

Another object of the invention is to produce with alternating current fillet welds of good appearance.

The apparatus involved in the present invention is shown in Belgian Patents Nos. 547,243 and 550,612 which corresponds with the U.S. patent application Serial No. 635,239 above referred to.

In the process of the invention, the shielding gas is either a mixture primarily composed of carbon dioxide and nitrogen or nitrogen alone.

To achieve the purposes mentioned above, $CO_2$ was first replaced by nitrogen in the welding operation using the electrode as described hereabove. The arc operation of this electrode was somewhat more sputtering than when conducted under $CO_2$. However, the weld bead was very good-looking, the metal was very ductile and the carbon content in the weld deposit was 0.045% instead of 0.081% for a weld obtained from the same electrode used in a $CO_2$ atmosphere.

Attempts were then made to weld with various types of electrodes of the classes described in Belgian Patent No. 547,243 (U.S. application Serial No. 635,239) and containing nickel and chromium in random proportions, but using as a shielding gas a mixture of $CO_2$ and nitrogen in various proportions. It was observed that the presence of $CO_2$ in the gaseous mixture results in a reduction of the spatter and in an increase of the carbon content in the weld.

The carburization remains however negligible for gaseous mixtures in which the $CO_2$ content is lower than 40% and the nitrogen content is higher than 60%.

The arc operation obtained, even with alternating current, with electrodes of the above-mentioned type under a shielding gaseous atmosphere consisting of a mixture of $CO_2$ and nitrogen containing at most 40% of $CO_2$, is very quiet and spatter is slight. The slag covers the metal well, and the fillet is convex and good-looking. Ripple marks are nearly invisible.

The chromium and the nickel can be introduced by any method in the electrode, but a preferred form of introduction when weld metal containing 18% chromium and 8% nickel is desired consists in selecting for the electrode shell a strip of ferritic steel containing 18% chromium surrounding a preferably narrow strip of metallic nickel, both strips being in close electric contact and the weight of nickel amounting to 8% of the total weight of both strips. The core of the electrode contains then merely the slag-forming materials and the deoxidizers.

Other forms of execution of electrodes as per the invention and/or of introduction of alloying elements in such electrodes may still be devised while remaining in the scope of the present invention provided that they conform to the conditions which define the invention.

In view of my invention and disclosure variations and modifications to meet individual whim or particular need will doubtless become evident to others skilled in the art, to obtain all or part of the benefits of my invention without copying the process and structure shown, and I therefore, claim all such insofar as they fall within the reasonable spirit and scope of my claim.

Having thus described my invention what I claim as new and desire to secure by Letters Patent is:

A process for automatic electric arc welding of austenitic stainless steel under a shielding gaseous atmosphere, which comprises feeding a continuous metallic electrode consisting of a metallic shell surrounding a granulated core composed essentially of a mixture of deoxidizers and slag-forming materials, to a point of welding, said core amounting to between 24 and 42 percent of the weight of the metallic portion of the electrode, and said electrode comprising in addition metallic chromium and nickel, and maintaining an electric arc between the electrode and the work while surrounding the arc with a protective gas mixture of nitrogen and carbon dioxide containing less than 40 percent of carbon dioxide and more than 60 percent of nitrogen.

References Cited in the file of this patent

UNITED STATES PATENTS

| | | |
|---|---|---|
| 1,589,017 | Lincoln | June 15, 1926 |
| 1,629,748 | Stoody | May 24, 1927 |
| 1,709,474 | Hawley | Apr. 16, 1929 |
| 2,350,387 | Cito | June 6, 1944 |
| 2,504,867 | Muller | Apr. 18, 1950 |
| 2,544,711 | Mikhalapov | Mar. 13, 1951 |
| 2,824,948 | Willigen | Feb. 25, 1958 |

FOREIGN PATENTS

| | | |
|---|---|---|
| 297,911 | Switzerland | June 6, 1944 |

OTHER REFERENCES

Welding Engineer, May 1957, pages 41, 42.
Welding Journal, November 1957, pages 1069–73.